(12) United States Patent
Tan et al.

(10) Patent No.: US 11,610,591 B2
(45) Date of Patent: Mar. 21, 2023

(54) MACHINE LEARNING FOR IMPROVING QUALITY OF VOICE BIOMETRICS

(71) Applicant: Capital One Services, LLC, McLean, VA (US)

(72) Inventors: Bozhao Tan, McLean, VA (US); Isabelle Alice Yvonne Moulinier, McLean, VA (US); David Almquist, McLean, VA (US); June Wu, McLean, VA (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 17/324,277

(22) Filed: May 19, 2021

(65) Prior Publication Data

US 2022/0375477 A1 Nov. 24, 2022

(51) Int. Cl.
| | | |
|---|---|---|
| *G10L 17/20* | (2013.01) | |
| *G10L 25/51* | (2013.01) | |
| *G10L 25/84* | (2013.01) | |
| *G10L 17/02* | (2013.01) | |
| *H04M 3/42* | (2006.01) | |
| *G10L 17/06* | (2013.01) | |
| *G10L 17/04* | (2013.01) | |

(52) U.S. Cl.
CPC ............. *G10L 17/20* (2013.01); *G10L 17/02* (2013.01); *G10L 17/04* (2013.01); *G10L 17/06* (2013.01); *G10L 25/51* (2013.01); *G10L 25/84* (2013.01); *H04M 3/42221* (2013.01)

(58) Field of Classification Search
CPC .......... G10L 17/20; G10L 25/51; G10L 25/84
See application file for complete search history.

(56) References Cited

U.S. PATENT DOCUMENTS

| | | | | |
|---|---|---|---|---|
| 9,799,329 B1* | 10/2017 | Pogue | ..................... | G10L 15/22 |
| 10,397,749 B1* | 8/2019 | Barua | ..................... | H04W 4/30 |
| 10,897,534 B1* | 1/2021 | Sui | ......................... | G10L 21/00 |
| 2017/0169828 A1* | 6/2017 | Sachdev | ................ | G10L 17/02 |
| 2019/0061467 A1* | 2/2019 | Churchwell, II | .. | B60H 1/00814 |
| 2020/0211571 A1* | 7/2020 | Shoa | ...................... | G10L 17/06 |

* cited by examiner

Primary Examiner — Bryan S Blankenagel
(74) Attorney, Agent, or Firm — Perkins Coie LLP

(57) ABSTRACT

Methods and systems are disclosed herein for improving the quality of audio for use in a biometric. A biometric system may use machine learning to determine whether audio or a portion of the audio should be used as a biometric for a user. A sample of the user's voice may be used to generate a voice signature of the user. Portions of the audio that do not meet a similarity threshold when compared with the voice signature may be removed from the audio. Additionally or alternatively, interfering noises may be detected and removed from the audio to improve the quality of a voice biometric generated from the audio.

17 Claims, 9 Drawing Sheets

100

201

| Segment 202 | Segment 204 (59) | Segment 206 (45) | Segment 208 (-34) | Segment 210 (75) |

| Segment 212 | Segment 214 (74) | Segment 216 (-67) | Segment 218 (-14) | Segment 220 (-18) |

FIG. 2B

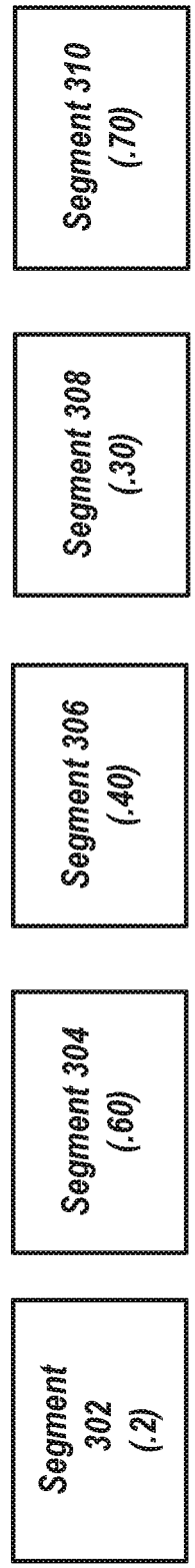

| Step | Window size/Interfering noise length | Step Rate | Extracted portion |
|---|---|---|---|
| 1 | 1 second | 0.15 | 0-1 seconds |
| 2 | 1 second | 0.15 | 0.15-1.15 seconds |

| Segment | Interfering noise ratio | Counts of interfering noises | Keep Segment |
|---------|------------------------|------------------------------|--------------|
| 322 | 0.9 | 4 | No |
| 323 | 0.1 | 2 | Yes |

FIG. 3C

MACHINE LEARNING FOR IMPROVING QUALITY OF VOICE BIOMETRICS

BACKGROUND

Voice biometrics are currently used to authenticate users and to grant them access to systems and/or sensitive data. However, it may be difficult to obtain a good sample of the user's voice in a way that is convenient for the user because background noise may interfere with the audio (e.g., a microphone may pick up background noise in a phone call). For example, audio may include multiple people's voices, dogs barking, loud traffic, music, or other sounds that make it difficult to generate a biometric using the audio recording. Additionally, it may be inconvenient for the user to take time to go to a quiet environment so that only the user's voice is heard. Given these issues, it may be difficult to create a voice biometric for a user with call audio.

SUMMARY

To address these and other issues, a biometric system may use machine learning to determine whether audio or a portion of the audio should be used as a biometric for a user. The biometric system may use an audio file generated based on a call between a user and an agent, with separate audio channels for the user and the agent (e.g., the user's audio channel may include audio received from a microphone on the user's device and the agent's audio channel may include audio received from a microphone on the agent's device). In this scenario, difficulties may arise when the user is transferred to another agent. The transfer may require that the second agent be placed into the user's audio channel so once the transfer occurs the user's audio channel may include both the user's voice and the other agent's voice. To obtain as much of the user's voice as possible, the biometric system may need to differentiate between segments of the conversation that include the user's voice and those that include the other agent's voice. The biometric system may process the user's audio channel to determine what portions, if any, of the user's audio channel may be used as a voice biometric for the user. The beginning of the call may include a sample of the user's voice and a machine learning model may be used to generate a voice signature of the user using a beginning portion of the user's audio channel. For example, if a user calls a call center to request information, the first 15 seconds of the user's audio channel may include the user explaining what the user is requesting. The voice signature of the user may be a vector representation of the beginning audio. The biometric system may compare the voice signature with other portions of the audio (e.g., the vector generated for the beginning portion may be compared with vectors generated for other portions of the audio) to determine what portions of the audio should be removed. To compare the voice signature with other portions of the audio, the biometric system may, for example, generate vector representations of the other portions using the machine learning model. The biometric system may use a distance metric to calculate a similarity score indicating the similarity between the voice signature and other vectors. The biometric system may remove portions from the audio, for example, if the similarity score of a portion does not satisfy a similarity threshold. For example, a portion of the audio may include traffic noises and a vector generated for the portion may not satisfy a similarity threshold when compared with the signature vector. By removing the non-matching portion, the biometric system may create a more accurate biometric sample that may be used more effectively to authenticate a user and provide the user access to sensitive systems and/or data.

The biometric system may receive an audio file of a phone call between a user and one or more call agents. The audio file may include a call agent channel including audio that has voice data of a call agent and a user audio channel that has voice data of a user. For example, a user may call a customer service center to obtain information about the user's account. The audio from the call may be recorded on two channels—one that corresponds to the device used by the user (the user audio channel) and one that corresponds to the device that the call agent uses (e.g., the call agent audio channel). The user audio channel may also include voice data from a second agent. For example, if the first agent needs to transfer the call to a second agent to help the user obtain account information, the voice audio of the second agent may be included in the user audio channel.

The biometric system may divide the user audio channel into multiple segments. A first subset of the segments may include one or more beginning segments of the user audio channel. For example, the user audio channel may be divided into equal segments that are three seconds long. The first five segments may be included as the first subset and the remaining segments may be included as the second subset. The biometric system may generate a signature vector for the user by inputting the first subset of segments into a machine learning model. The signature vector may be a voice print that indicates the user's voice. For example, the first five segments may be input into the machine learning model and the machine learning model may generate a vector representation of the inputted segments to use as the signature vector. The biometric system may generate a vector representation of each segment in the second subset of segments. For example, the biometric system may input each segment in the second subset of segments into the machine learning model and generate a vector representation of each segment. By generating a vector representation of each segment, the biometric system may be able to use the vector representations to compare each segment with the signature vector. Doing so may allow the biometric system to determine which segments are not similar to (e.g., do not match, do not satisfy a similarity threshold, etc.) the signature vector and thus should be removed from the audio. The biometric system may compare the signature vector with each of the vectors for the second subset of segments. The biometric system may remove any segment that it determines does not match the signature vector (e.g., a distance or similarity score between a vector generated for a segment and the signature vector does not satisfy a threshold). The biometric system may generate a voice biometric using the remaining segments and may provide the voice biometric to a voice based user authentication server.

In some embodiments, the biometric system may improve the biometric sample by searching for and removing portions (e.g., segments) of the audio that are determined to be known interfering noise (e.g., traffic, multiple people talking, pet noises, noises from movies or music, etc.). The biometric system may receive audio of a phone call between a user and one or more call agents and may divide the audio file into segments. The biometric system may use recordings of interfering noises to generate audio signatures. For example, one audio signature may correspond to a ringtone that indicates a call agent transfer, one audio signature may correspond to traffic noises, etc. The biometric system may determine a window size and step rate for each audio signature. Each window size and each step rate may be determined based on the length of an expected interfering noise (e.g., the step rate may be a fraction of the window size). For example, if the audio sample used to generate the signature for a ringtone is 2 seconds long, the window size may be two seconds and a step rate may be one tenth of a second. The window size and step rate may be used in a loop over the audio file that enables the biometric system to determine if any portion of the audio file matches the interfering noise.

The biometric system may compare audio data within each of the segments with each of the audio signatures. If a threshold portion of segment corresponds (e.g., matches or is determined to be similar based on a distance metric calculated using the audio signature vector and vector generated for the segment), the biometric system may remove the segment from the first audio file. The biometric system may generate, using the portions of the audio that were not removed, a voice biometric for the user, and may provide the voice biometric to an authentication server.

Various other aspects, features, and advantages of the disclosure will be apparent through the detailed description of the disclosure and the drawings attached hereto. It is also to be understood that both the foregoing general description and the following detailed description are examples and not restrictive of the scope of the disclosure. As used in the specification and in the claims, the singular forms of "a," "an," and "the" include plural referents unless the context clearly dictates otherwise. In addition, as used in the specification and the claims, the term "or" means "and/or" unless the context clearly dictates otherwise. Additionally, as used in the specification "a portion," refers to a part of, or the entirety of (i.e., the entire portion), a given item (e.g., data) unless the context clearly dictates otherwise.

BRIEF DESCRIPTION OF THE DRAWINGS

FIGS. 2A-2B show example audio that has been divided into segments, in accordance with some embodiments.

FIG. 3A shows example audio that has been divided into segments, in accordance with some embodiments.

FIG. 3B shows a table with steps of an example loop for detecting interfering noises in audio, in accordance with some embodiments.

FIG. 3C shows a table with example segments and a biometric system's determination on whether to keep or remove the segment, in accordance with some embodiments.

DETAILED DESCRIPTION

In the following description, for the purposes of explanation, numerous specific details are set forth in order to provide a thorough understanding of the disclosure. It will be appreciated, however, by those having skill in the art, that the disclosure may be practiced without these specific details or with an equivalent arrangement. In other cases, well-known structures and devices are shown in block diagram form to avoid unnecessarily obscuring the disclosure.

Figure 1:
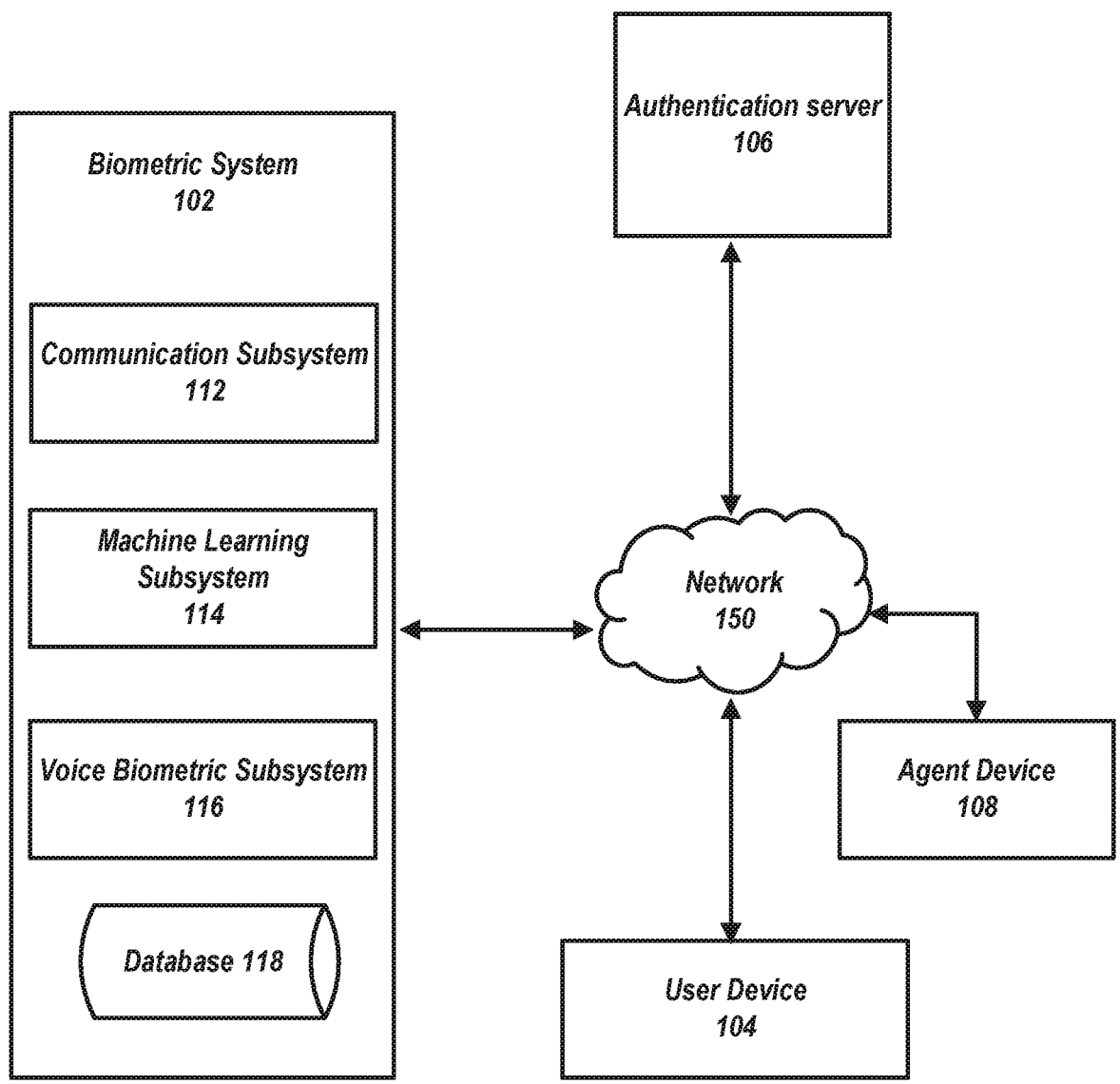
FIG. 1 shows an example biometric system for determining what portions of audio to use in a voice biometric, in accordance with some embodiments.

FIG. 1 shows an example computing system 100 for using one or more machine learning models to determine audio to use in a biometric for a user. The computing system 100 may use a portion of the audio (e.g., the first 5 seconds of the audio, the first 20 seconds of the audio, etc.) to generate a signature vector. For example, if a user calls a bank to request information about a loan, a portion of the audio may include the user explaining what the user is requesting. The voice signature of the user may be a vector representation of the audio corresponding to the user's explanation. The computing system 100 may compare the voice signature with other portions of the audio (e.g., the vector generated for the beginning portion may be compared with vectors generated for other portions of the audio) to determine what portions of the audio should be removed. To compare the voice signature with other portions of the audio, the computing system 100 may, for example, generate vector representations of the other portions using the machine learning model. The computing system 100 may use a distance function (e.g., distance metric) to calculate a similarity score indicating the similarity between the voice signature and other vectors. A distance function may take two vectors as input and may output data (e.g., one or more values) that indicates a relationship between the two vectors. For example, the distance metric/function may be cosine distance, Minkowski distance, Mahalanobis distance, etc. The computing system 100 may remove portions from the audio, for example, if the similarity score of a portion does not satisfy a similarity threshold. For example, a portion of the audio may include traffic noises and a vector generated for the portion may not satisfy a similarity threshold when compared with the signature vector. By removing the non-matching portion, the computing system 100 may create a biometric sample that may be used more effectively to authenticate a user and provide the user access to sensitive systems and/or data.

Additionally or alternatively, the computing system 100 may search for and remove portions of the audio that it determines to be similar to a known interfering noise (e.g., traffic, multiple people talking, pet noises, noises from movies or music, etc.). The computing system 100 may use recordings of interfering noises to generate audio signatures for those interfering noises. For example, one audio signature may correspond to a ringtone that indicates a call agent transfer, one audio signature may correspond to traffic noises, etc. The computing system 100 may determine a window size and step rate for each audio signature. The window size and step rate may be used in a loop over the audio file that enables the computing system 100 to determine if any portion of the audio file matches the interfering noise. Portions of the audio that include one or more interfering noises may be removed so that a voice biometric for the user may be generated using the remaining portions.

The computing system 100 may include a biometric system 102, a user device 104, an authentication server 106, and/or an agent device 108. The biometric system 102 may include a communication subsystem 112, a machine learning (ML) subsystem 114, a voice biometric subsystem 116, and/or a database 118. The communication subsystem 112 may receive an audio file (e.g., of a phone call or other call, chat, etc.) between a user and one or more call agents. The audio file may include a first portion of audio and a second portion of audio. The second portion may be associated with the user (e.g., the second portion may include the user audio channel) and may include audio received at the user device 104 (e.g., the audio may be sent to the biometric system 102 from the user device 104). The first portion may include audio associated with a call agent (e.g., the first portion may include the agent audio channel) and may include audio received at the agent device 108. A first agent may transfer the call to a second agent to assist the user and the audio from the second agent may be recorded and/or stored in the second portion. For example, the second agent may join the call, and audio (e.g., voice audio) from the second agent's environment may be added to the second portion (e.g., the user audio channel).

The ML subsystem 114 may implement one or more machine learning models as described below in connection with FIG. 4. The ML subsystem 114 may divide the audio into segments and may process the segments to assist in determining which segments, if any, would not be suitable for use as a voice biometric for the user (e.g., because the segments are determined to not be similar to the user's voice, and/or because the segments contain noise, poor quality audio, or have other issues). The system 100 may remove the segments that are determined to not be suitable for use as a voice biometric and use the remaining segments in a voice biometric. The ML subsystem 114 may divide the second portion (e.g., the user audio channel) of the call into a plurality of segments. For example, the second portion may be divided into equal length segments (e.g., that are 1 second long, 4 seconds long, 30 seconds long, etc.). The plurality of segments may be further divided into a first subset of segments and a second subset of segments. The first subset of segments may include one or more (e.g., one, two, three, etc.) segments starting from the beginning of the second portion of the call. For example, if each segment is five seconds long, the first subset of segments may include the first three consecutive segments, which in this example, may be the first 15 seconds of the user audio channel. For example, referring to FIG. 2A the audio 201 may be divided into segments 202-210. The segments 202-210 may be equal length (e.g., they may each contain 1 second, 5 seconds, 30 seconds, etc. of audio). Alternatively, one or more segments 202-210 may have different lengths. For example, segment 202 may be 15 seconds long, and segments 204-210 may each be 5 seconds long. The first subset of segments (e.g., which may be used to generate the signature vector) may include segment 202, and the second subset of segments may include segments 204-210.

Referring to FIG. 1, the ML subsystem 114 may generate a signature vector indicative of voice audio of the user. For example, the ML subsystem 114 may input the first subset of segments into a machine learning model that has been trained to generate vector representations of audio (e.g., voice prints). For example, voices or other sounds that are similar (e.g., voice audio from the same person) may be mapped to similar vector representations. The machine learning model may be used to generate the signature vector which may be used to identify the user's voice. In some embodiments the machine learning model may take varying lengths (e.g., one segment, two segments, four segments, etc.) of audio and may output a fixed length vector (e.g., the size of the vector output by the machine learning model may be unvarying despite varying lengths of input). For example, referring to FIG. 2A, the signature vector may be generated using segment 202 (e.g., because it is the first segment of the audio). In some embodiments, the first subset may include multiple segments. The machine learning model may generate a signature vector by generating a vector for each segment in the first subset and averaging the generated vectors. Alternatively, the machine learning model may generate a signature vector by generating a vector for each segment in the first subset and concatenating each of the generated vectors. Alternatively, the biometric system 102 (e.g., the ML subsystem 114) may generate a signature vector by concatenating each segment in the first subset and inputting the concatenated segment into the machine learning model to output the signature vector. The ML subsystem 114 may verify the generated signature vector by comparing it with a stored audio sample. For example, the stored audio sample may be a received recording of the user's voice (e.g., the signature vector may be verified prior to comparing it with other vectors corresponding to other segments). The ML subsystem 114 may determine a distance or similarity score between a vector generated for the recording of the user's voice and the signature vector. If the similarity score satisfies a threshold, the ML subsystem 114 may determine that the signature vector has passed verification.

Referring to FIG. 1, the ML subsystem 114 may generate a vector representation for each segment in the second subset of segments. The vectors may be used to compare the segments with the signature segment. For example, if the first subset of segments contains a sample of the user's voice, the signature vector may be compared with vectors generated for other segments to determine if the other segments contain the users voice or if they contain too much noise, other people's voices, or other interfering noises. For example, referring to FIG. 2A, a vector representation may be generated (e.g., by the ML subsystem 114 of FIG. 1) for each segment 204-210. A first vector representation may be generated for segment 204, a second vector representation may be generated for segment 206, and so on.

Referring to FIG. 1, the voice biometric subsystem 116 may use the vectors to determine portions of the audio to remove (e.g., because they do not sufficiently match the user's voice). The voice biometric subsystem 116 may compare the signature vector with each of the plurality of vectors generated for the second subset of segments. The voice biometric subsystem 116 may compare vectors using a distance metric (e.g., any distance metric for comparing vectors as known to those skilled in the art). For example, cosine distance, linear discriminant analysis (LDA), and/or probabilistic linear discriminant analysis (PLDA) may be used to compare vectors. The voice biometric subsystem 116 may use the distance metric to compute a distance (e.g., a similarity score) for a vector. The similarity score may indicate how close or similar a vector is to the signature vector. For example, referring to FIG. 2A, the similarity score for segment 204 may be 59, and may indicate how similar the vector for segment 204 is to the vector for segment 202 (e.g., the similarity score may indicate a distance, as defined by a distance metric, between the vector generated for segment 202 and the vector generated for segment 204). If the similarity score is above a threshold value, the biometric system 102 may determine that the segment 204 matches the segment 202 (e.g., the voice detected in segment 202 corresponds to the same user as the voice detected in segment 204).

The voice biometric subsystem 116 may remove segments from the audio, for example, if it does not match the signature vector. The voice biometric subsystem 116 may determine that a segment does not match the signature vector, for example, if the distance (e.g., the similarity score) between the signature vector and the vector representation of the segment does not satisfy a threshold (e.g., a similarity threshold). For example, the voice biometric subsystem 116 may determine that a segment does not match the signature vector if the distance or similarity score is not above a threshold value (e.g., 0, 0.5, 35, etc.). The voice biometric subsystem 116 may remove any segment that it determines does not match the signature vector. For example, referring to FIG. 2A, if the threshold value for similarity scores is 20, the voice biometric subsystem 116 may determine that segment 204 (with a similarity score of 59), segment 206 (with a similarity score of 45), and segment 210 (with a similarity score of 75) match segment 202 (e.g., because the similarity scores are above 20). The voice biometric subsystem 116 may determine that segment 208 (with a similarity score of −34) does not match the segment 202 (e.g., because the similarity score, which may indicate a distance between the vector for segment 208 and the signature vector 202, is below the threshold value of 20). The voice biometric subsystem 116 may remove the segment 208 from the audio 201, for example, based on determining that segment 208 does not match segment 202 (e.g., based on determining that the vector for segment 208 does not match the signature vector). In some embodiments, the voice biometric subsystem 116 may remove one or more segments. For example, the voice biometric subsystem 116 may remove any segment that is below a similarity score threshold.

The voice biometric subsystem 116 may generate a voice biometric for the user using the remaining segments of the second portion of the phone call. The voice biometric subsystem 116 may generate the biometric by concatenating the segments that remain and inputting the concatenated segment into a machine learning model, for example, to generate a vector representation of the concatenated segment. The vector representation may be used as the voice biometric for the corresponding user's voice. For example, referring to FIG. 2A, the voice biometric subsystem 116 may concatenate segments 202, 204, 206, and 210 (e.g., by removing segment 208) and input them into a machine learning model to generate the voice biometric. Alternatively, the voice biometric subsystem 116 may generate a voice biometric by averaging vectors corresponding to the remaining segments. For example, the voice biometric subsystem 116 may generate a voice biometric by averaging the vectors generated for segments 202, 204, 206, and 210. The communication subsystem 112 may provide the generated voice biometric to the authentication server 106.

In some embodiments, the system may determine that a biometric should not be generated because the audio (e.g., as a whole) is not suitable for use as a biometric. The biometric system 102 may determine to not generate a voice biometric using the audio, for example, if the audio is not suitable for use as a biometric. The biometric system 102 may instead send an indication to the authentication server 106, user device 104, and/or agent device 108 that the audio is not suitable for generating a voice biometric for the user. The biometric system 102 may determine that audio is not suitable for use as a biometric, for example, if more than a threshold portion (e.g., more than a threshold number of segments in the second subset of segments) of the audio is determined to not match the first subset of segments (e.g., more than a threshold number of vectors are determined to not be within a threshold distance of the signature vector). For example, referring to FIG. 2B, the biometric system may determine not to use the audio 211, because more than a threshold number of segments do not match the segment 212 (e.g., the distance or similarity score between a vector generated for the segment 212 and vectors generated for other segments 216, 218, and 220). The similarity score for segment 214 may be 74 and may satisfy the similarity threshold. The similarity scores for segments 216-220 may not satisfy a similarity threshold and may be removed from the audio 211. In this example, the voice biometric subsystem 116 may determine that the audio 211 should not be used to generate a voice biometric because the threshold number of segments that need to remain to use the audio for generating a biometric may be three segments. Additionally or alternatively, the threshold may be a percentage (e.g., 10%, 30%, 65%, etc.). For example, if more than 30% of the segments are removed from the audio, the biometric system 102 may determine that the audio should not be used for generating a biometric for the user.

In some embodiments the ML subsystem 114 may determine which segments should be in the first subset and which segments should be in the second subset of segments. To determine which segments belong in the first subset, the ML subsystem 114 may divide the second portion into equal length segments and may generate a vector representation for each of the segments. The ML subsystem 114 may determine a similarity score for each segment (e.g., as discussed above). Each similarity score may indicate how similar a segment is to the first segment (e.g., segment 202 in FIG. 2A) in the audio. The ML subsystem may assign each segment that has a high enough similarity score (e.g., greater than a threshold score) to the first subset of segments. The threshold may be a value that is higher than the threshold score used to determine whether a segment should be removed as discussed herein. For example, if the threshold score for determining whether to remove a segment from the audio is 20, the threshold score for determining whether a segment belongs in the first subset may be 50. In this example, segments that have a similarity score that is greater than 50 may be included in the first subset of segments. In some embodiments, the first subset of segments may be limited to a number of segments starting from the beginning of the audio. The ML subsystem 114 may add segments to the first subset until it reaches a segment that does not meet the threshold. For example, segment 204 may be added to the first subset because it's similarity score is 59 (e.g., it is greater than the threshold score of 50), but because the similarity score for segment 206 is less than 50, neither segment 206 nor any subsequent segments are included in the first subset.

In some embodiments, the biometric system 102 may determine portions of audio that include interfering noises (e.g., noises that the biometric system 102 determines are not the user's voice). The audio may include noises (e.g., environmental noises) that are not created by the user's voice (e.g., the user for whom the biometric is being generated). For example, there may be other people talking, music playing, noises from appliances and pets, or other interfering noises in the background. The biometric system 102 may determine portions of the audio that contain these interfering noises and remove them from the audio, for example, so that a higher quality biometric may be generated for the user.

The ML subsystem 114 may retrieve, from the database 118, audio that includes one or more interfering noises. For example, the database 118 may store one or more audio files that include audio corresponding to known interfering noises (e.g., ringtone, animal, appliance, traffic, music, movies, or other noises). The ML subsystem 114 may generate an audio signature for one or more of the interfering noises. The ML subsystem 114 may generate an audio signature by inputting an audio file into a machine learning model (e.g., as described in connection with FIG. 4 below). The machine learning model may be used to generate a vector representation of the interfering noise. The vector representation of the interfering noise may be used as the audio signature for the interfering noise.

The voice biometric subsystem 116 may use the one or more audio signatures generated by the ML subsystem 114 to determine portions of the audio that include interfering noises. The voice biometric subsystem 116 may loop over audio (e.g., one or more segments of audio as shown in FIG. 3A) of the call between the user and the agent and may compare an audio signature with a portion of the call at each step of the loop. For example, the loop may begin at the beginning of the audio of the call and may proceed through the audio of the call at a step rate determined by the ML subsystem 114. At the first step of the loop, the ML subsystem 114 may extract a portion of the call audio. The portion of the call audio may be determined based on the length of the interfering noise that corresponds to an audio signature. The portion of the call audio may be used to generate a vector and the vector may be compared with an audio signature (e.g., using a distance metric). For example, FIG. 3B shows a table with example steps of a loop over call audio. The loop may be used to detect a ringtone (e.g., an interfering noise) in the call audio. The window size (the length of the portion of the call audio that is compared at each step) may be one second long, for example, because the ringtone is one second long. The step rate may be determined to be 0.15 seconds long (e.g., the ML subsystem may use a step rate that is 15 percent of the length of the interfering noise). At step 312 (e.g., the first step) of the loop, the ML subsystem 114 may use a portion of the call audio from 0 seconds to 1 second (e.g., a one second portion) to generate a vector. The generated vector may be compared with the signature vector (e.g., by calculating a similarity score as discussed above) to determine whether the portion matches the signature vector (e.g., which may indicate that the portion includes the ringtone). At step 313 (e.g., the second step) of the loop, the ML subsystem 114 may use the portion of the call audio from 0.15 seconds to 1.15 seconds (e.g., a one second portion) to determine whether the portion matches the signature vector. This process may continue, for example, until the ML subsystem 114 has looped through the entire call audio or a segment of the call audio. Although only two steps of the loop are shown in FIG. 3C, a loop for detecting an interfering noise in call audio may include any number of steps.

The ML subsystem 114 may compare each audio signature (e.g., corresponding to the interfering noises) with the call audio. The ML subsystem 114 may determine that a portion of the call audio includes an interfering noise, for example, if a similarity score satisfies a threshold. The voice biometric subsystem 116 may determine the proportion of a segment that includes interfering noises. Additionally or alternatively, the voice biometric subsystem 116 may determine the number of interfering noises a segment contains. The voice biometric subsystem 116 may remove any segments that have more than a threshold proportion of interfering noise. Additionally or alternatively, the voice biometric subsystem 116 may remove any segments that have more than a threshold number of interfering noises detected in them. For example, FIG. 3C shows an example table with segments and the proportion of the segments that include interfering noises, the number of interfering noises detected in each segment, and a determination of whether to remove the segment or keep the segment for use in generating a voice biometric. The biometric system 102 may determine that 90% of segment 322 contains interfering noises (e.g., if segment 322 is 10 seconds long, 9 out of 10 seconds were determined to match one or more interfering noises). The biometric system 102 may determine that segment 322 has 4 interfering noises (e.g., 4 unique noises or one or more repeating noises). The biometric system 102 may determine that segment 322 should be removed from the call audio, for example, because more than a threshold proportion of the segment contain interfering noises and/or because more than a threshold number of interfering noises were detected in the segment 322. The biometric system 102 may determine that 10% of segment 323 contains interfering noises and that two interfering noises were detected in the segment 323. The biometric system 102 may determine that segment 323 should not be removed from the call audio, for example, because less than a threshold proportion of the segment contain interfering noises and/or because less than a threshold number of interfering noises were detected in the segment 323.

The biometric system 102 may determine to remove one or more segments from call audio. For example, if the biometric system 102 may remove a segment from the call audio if one or more interfering noises is detected in the call audio. Additionally or alternatively, the biometric system 102 may remove a segment from the call audio if more than a threshold proportion of the segment contains interfering noises. For example, FIG. 3A shows example call audio 301 that has been divided into segments 302-310. The biometric system 102 may determine that 20% of segment 302 (e.g., if the segment 302 is 100 seconds long, one or more interfering noises were detected in 20 seconds of the segment 302), 60% of segment 304, 40% of segment 306, 30% of segment 308, and 70% of segment 310 include interfering noise. The biometric system 102 may remove segments 304 and 310 from the audio 301 for example, if the threshold proportion for removing a segment is 50%. The biometric system 102 may generate a voice biometric using the remaining segments and may provide the voice biometric to a user authentication system (e.g., a voice based user authentication system) as discussed above. In some embodiments the biometric system 102 may determine a subset of segments to use for generating the voice biometric. For example, the biometric system 102 may determine to use a predetermined number (e.g., 3, 10, 20, etc.) of segments that have the smallest proportion of interfering noise. For example, the biometric system 102 may rank the segments in order of proportion of interfering noise and use the predetermined number of segments with the lowest proportion of interfering noise. Improving the quality of voice biometrics as well as other techniques are described in U.S. patent application Ser. No. 17/324,311 filed on May 19, 2021, entitled "Machine Learning for Improving Quality of Voice Biometrics" which is hereby incorporated herein by reference in its entirety.

The user device 104 may be any computing device, including, but not limited to, a laptop computer, a tablet computer, a hand-held computer, smartphone, other computer equipment (e.g., a server or virtual server), including "smart," wireless, wearable, and/or mobile devices. Although only one client device 104 is shown, the system 100 may include any number of client devices, which may be configured to communicate with the biometric system 102 via the network 150.

The biometric system 102 may include one or more computing devices described above and/or may include any type of mobile terminal, fixed terminal, or other device. For example, the biometric system 102 may be implemented as a cloud computing system and may feature one or more component devices. A person skilled in the art would understand that system 100 is not limited to the devices shown in FIG. 1. Users may, for example, utilize one or more other devices to interact with devices, one or more servers, or other components of system 100. A person skilled in the art would also understand that while one or more operations are described herein as being performed by particular components of the system 100, those operations may, in some embodiments, be performed by other components of the system 100. As an example, while one or more operations are described herein as being performed by components of the biometric system 102, those operations may be performed by components of the client device 104, and/or server 106. In some embodiments, the various computers and systems described herein may include one or more computing devices that are programmed to perform the described functions. Additionally or alternatively, multiple users may interact with system 100 and/or one or more components of system 100. For example, a first user and a second user may interact with the biometric system 102 using two different client devices.

One or more components of the biometric system 102, client device 104, and/or authentication server 106, may receive content and/or data via input/output (hereinafter "I/O") paths. The one or more components of the biometric system 102, the client device 104, and/or the authentication server 106 may include processors and/or control circuitry to send and receive commands, requests, and other suitable data using the I/O paths. The control circuitry may include any suitable processing, storage, and/or input/output circuitry. Each of these devices may include a user input interface and/or user output interface (e.g., a display) for use in receiving and displaying data. It should be noted that in some embodiments, the biometric system 102, the client device 104, and/or the authentication server 106 may have neither user input interface nor displays and may instead receive and display content using another device (e.g., a dedicated display device such as a computer screen and/or a dedicated input device such as a remote control, mouse, voice input, etc.). Additionally, the devices in system 100 may run an application (or another suitable program).

One or more components and/or devices in the system 100 may include electronic storages. The electronic storages may include non-transitory storage media that electronically stores information. The electronic storage media of the electronic storages may include one or both of (a) system storage that is provided integrally (e.g., substantially non-removable) with servers or client devices or (ii) removable storage that is removably connectable to the servers or client devices via, for example, a port (e.g., a USB port, a firewire port, etc.) or a drive (e.g., a disk drive, etc.). The electronic storages may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storages may include one or more virtual storage resources (e.g., cloud storage, a virtual private network, and/or other virtual storage resources). The electronic storages may store software algorithms, information determined by the processors, information obtained from servers, information obtained from client devices, or other information that enables the functionality as described herein.

FIG. 1 also includes a network 150. The network 150 may be the Internet, a mobile phone network, a mobile voice or data network (e.g., a 5G or LTE network), a cable network, a public switched telephone network, a combination of these networks, or other types of communications networks or combinations of communications networks. The devices in FIG. 1 (e.g., biometric system 102, the client device 104, and/or the authentication server 106) may communicate (e.g., with each other or other computing systems not shown in FIG. 1) via the network 150 using one or more communications paths, such as a satellite path, a fiber-optic path, a cable path, a path that supports Internet communications (e.g., IPTV), free-space connections (e.g., for broadcast or other wireless signals), or any other suitable wired or wireless communications path or combination of such paths. The devices in FIG. 1 may include additional communication paths linking hardware, software, and/or firmware components operating together. For example, the biometric system 102, any component of the biometric system (e.g., the communication subsystem 112, the ML subsystem 114, the biometric subsystem 116, and/or the database 118), the client device 104, and/or the authentication server 106 may be implemented by one or more computing platforms.

Figure 4:
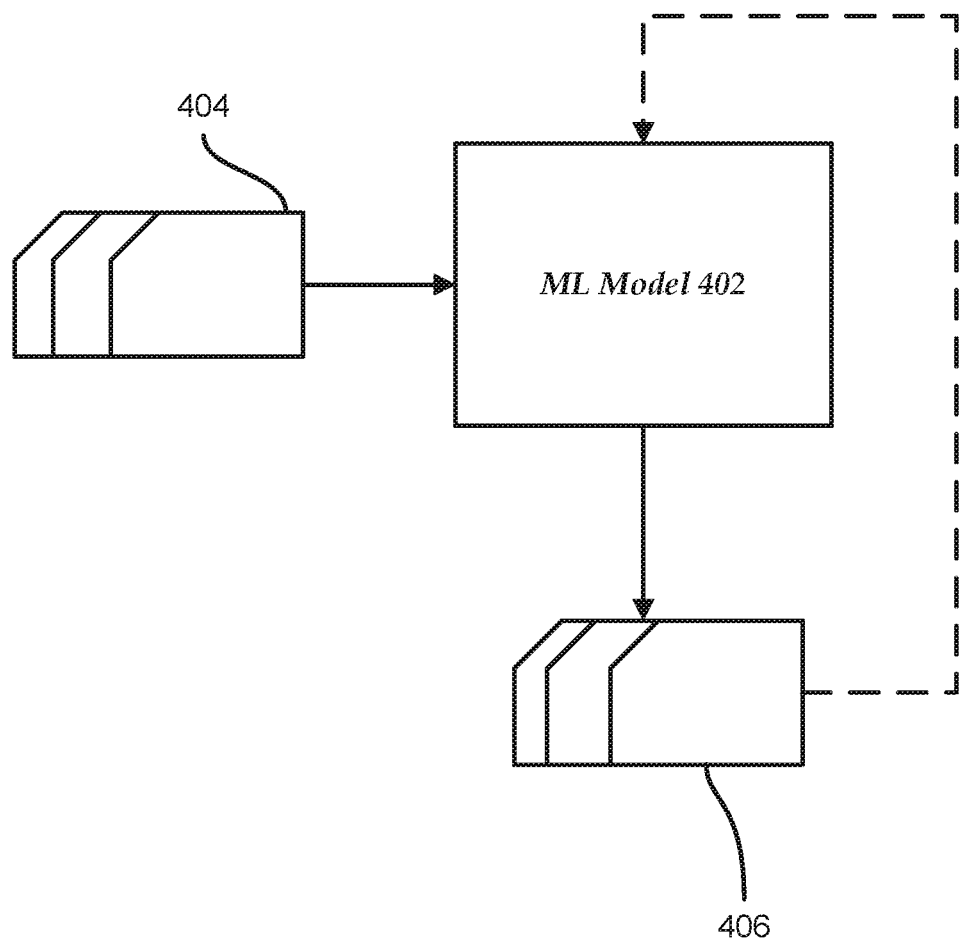
FIG. 4 shows an example of a machine learning model, in accordance with some embodiments.

The ML subsystem 114 may implement one or more machine learning models, for example, as shown in FIG. 4. With respect to FIG. 4, machine learning model 402 may take inputs 404 and provide outputs 406. For example, the inputs 404 may include audio segments (e.g., as described above in connection with FIGS. 1-3) or audio corresponding to interfering noises (e.g., as discussed above in connection with FIGS. 3A-3C) that have been featurized into mel-frequency coefficients (MFCCs). In one use case, outputs 406 may be fed back to machine learning model 402 as input to train machine learning model 402 (e.g., alone or in conjunction with user indications of the accuracy of outputs 406, labels associated with the inputs, or with other reference feedback information). In another use case, machine learning model 402 may update its configurations (e.g., weights, biases, or other parameters) based on its assessment of its prediction (e.g., outputs 406) and reference feedback information (e.g., user indication of accuracy, reference labels, or other information). In another use case, where machine learning model 402 is a neural network, connection weights may be adjusted to reconcile differences between the neural network's prediction and the reference feedback. In a further use case, one or more neurons (or nodes) of the neural network may require that their respective errors are sent backward through the neural network to them to facilitate the update process (e.g., backpropagation of error). Updates to the connection weights may, for example, be reflective of the magnitude of error propagated backward after a forward pass has been completed. In this way, for example, the machine learning model 402 may be trained to generate results (e.g., response time predictions, sentiment identifiers, urgency levels, etc.) with better recall and/or precision.

In some embodiments, the machine learning model 402 may include an artificial neural network. In such embodiments, machine learning model 402 may include an input layer and one or more hidden layers. Each neural unit of the machine learning model may be connected with one or more other neural units of the machine learning model 402. Such connections can be enforcing or inhibitory in their effect on the activation state of connected neural units. Each individual neural unit may have a summation function which combines the values of all of its inputs together. Each connection (or the neural unit itself) may have a threshold function that a signal must surpass before it propagates to other neural units. The machine learning model 402 may be self-learning and/or trained, rather than explicitly programmed, and may perform significantly better in certain areas of problem solving, as compared to computer programs that do not use machine learning. During training, an output layer of the machine learning model 402 may correspond to a classification, and an input known to correspond to that classification may be input into an input layer of machine learning model during training. During testing, an input without a known classification may be input into the input layer, and a determined classification may be output. For example, the machine learning model 402 may implement a neural network (e.g., a time delay neural network) that is used to extract or generate an embedding (e.g., a vector representation) from variable length inputs (e.g., MFCCs generated from the audio segments).

The machine learning model 402 may be structured as a factorization machine model. The machine learning model 402 may be a non-linear model and/or supervised learning model that can perform classification and/or regression. For example, the machine learning model 402 may be a general-purpose supervised learning algorithm that the system uses for both classification and regression tasks. Alternatively, the machine learning model 402 may include a Bayesian model configured to generate a vector representation of one or more audio segments (e.g., the segments described above in connection with FIG. 1).

Figure 5:
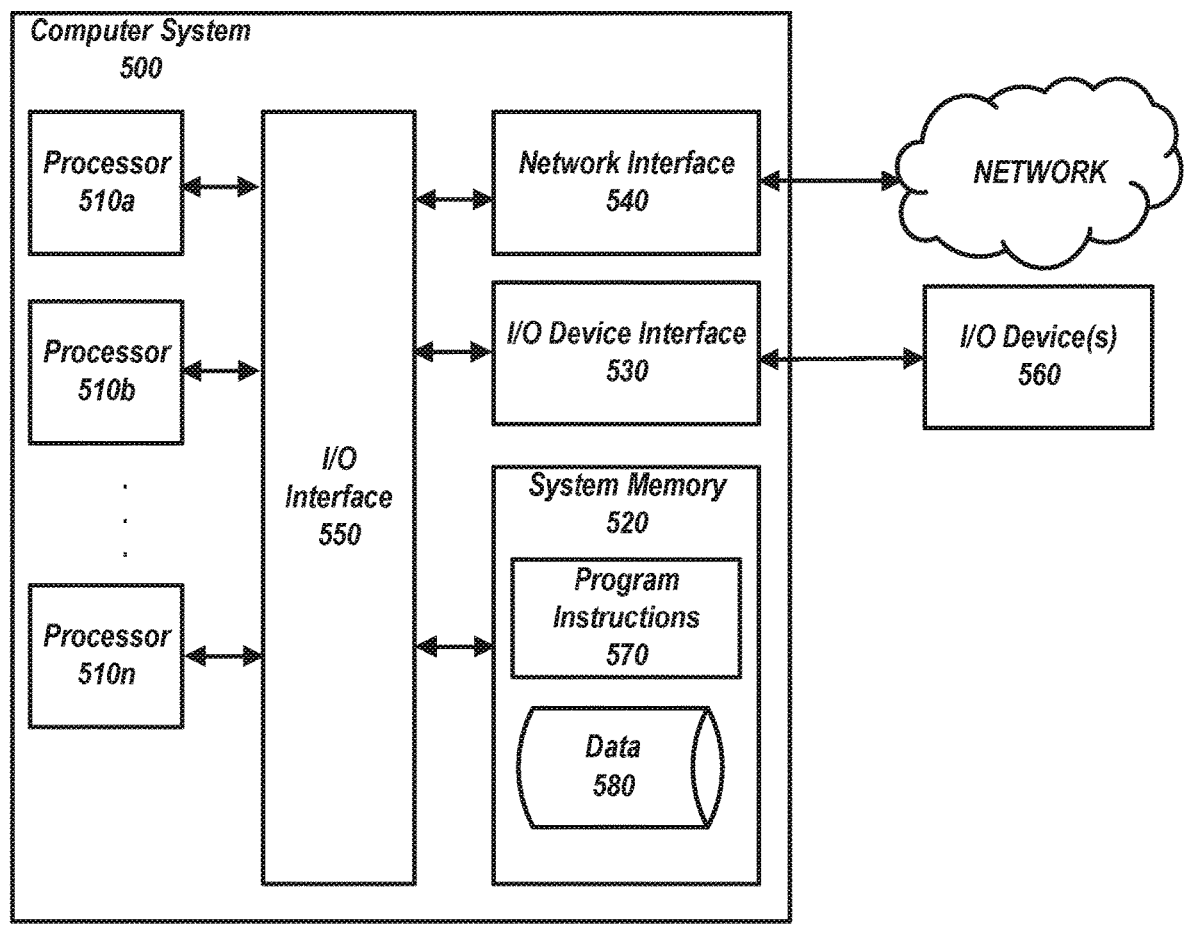
FIG. 5 shows an example computing system that may be used to determine a time to send a notification, in accordance with some embodiments.

FIG. 5 is a diagram that illustrates an exemplary computing system 500 in accordance with embodiments of the present technique. Various portions of systems and methods described herein, may include or be executed on one or more computing systems similar to computing system 500. Further, processes and modules described herein may be executed by one or more processing systems similar to that of computing system 500.

Computing system 500 may include one or more processors (e.g., processors 510a-510n) coupled to system memory 520, an input/output I/O device interface 530, and a network interface 540 via an input/output (I/O) interface 550. A processor may include a single processor or a plurality of processors (e.g., distributed processors). A processor may be any suitable processor capable of executing or otherwise performing instructions. A processor may include a central processing unit (CPU) that carries out program instructions to perform the arithmetical, logical, and input/output operations of computing system 500. A processor may execute code (e.g., processor firmware, a protocol stack, a database management system, an operating system, or a combination thereof) that creates an execution environment for program instructions. A processor may include a programmable processor. A processor may include general or special purpose microprocessors. A processor may receive instructions and data from a memory (e.g., system memory 520). Computing system 500 may be a units-processor system including one processor (e.g., processor 510a), or a multi-processor system including any number of suitable processors (e.g., 510a-510n). Multiple processors may be employed to provide for parallel or sequential execution of one or more portions of the techniques described herein. Processes, such as logic flows, described herein may be performed by one or more programmable processors executing one or more computer programs to perform functions by operating on input data and generating corresponding output. Processes described herein may be performed by, and apparatus can also be implemented as, special purpose logic circuitry, e.g., an FPGA (field programmable gate array) or an ASIC (application specific integrated circuit). Computing system 500 may include a plurality of computing devices (e.g., distributed computing systems) to implement various processing functions.

I/O device interface 530 may provide an interface for connection of one or more I/O devices 560 to computing system 500. I/O devices may include devices that receive input (e.g., from a user) or output information (e.g., to a user). I/O devices 560 may include, for example, graphical user interface presented on displays (e.g., a cathode ray tube (CRT) or liquid crystal display (LCD) monitor), pointing devices (e.g., a computer mouse or trackball), keyboards, keypads, touchpads, scanning devices, voice recognition devices, gesture recognition devices, printers, audio speakers, microphones, cameras, or the like. I/O devices 560 may be connected to computing system 500 through a wired or wireless connection. I/O devices 560 may be connected to computing system 500 from a remote location. I/O devices 560 located on remote computing system, for example, may be connected to computing system 500 via a network and network interface 540.

Network interface 540 may include a network adapter that provides for connection of computing system 500 to a network. Network interface may 540 may facilitate data exchange between computing system 500 and other devices connected to the network. Network interface 540 may support wired or wireless communication. The network may include an electronic communication network, such as the Internet, a local area network (LAN), a wide area network (WAN), a cellular communications network, or the like.

System memory 520 may be configured to store program instructions 570 or data 580. Program instructions 570 may be executable by a processor (e.g., one or more of processors 510a-510n) to implement one or more embodiments of the present techniques. Instructions 570 may include modules of computer program instructions for implementing one or more techniques described herein with regard to various processing modules. Program instructions may include a computer program (which in certain forms is known as a program, software, software application, script, or code). A computer program may be written in a programming language, including compiled or interpreted languages, or declarative or procedural languages. A computer program may include a unit suitable for use in a computing environment, including as a stand-alone program, a module, a component, or a subroutine. A computer program may or may not correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one or more computer processors located locally at one site or distributed across multiple remote sites and interconnected by a communication network.

System memory 520 may include a tangible program carrier having program instructions stored thereon. A tangible program carrier may include a non-transitory computer readable storage medium. A non-transitory computer readable storage medium may include a machine readable storage device, a machine readable storage substrate, a memory device, or any combination thereof. Non-transitory computer readable storage medium may include non-volatile memory (e.g., flash memory, ROM, PROM, EPROM, EEPROM memory), volatile memory (e.g., random access memory (RAM), static random access memory (SRAM), synchronous dynamic RAM (SDRAM)), bulk storage memory (e.g., CD-ROM and/or DVD-ROM, hard-drives), or the like. System memory 520 may include a non-transitory computer readable storage medium that may have program instructions stored thereon that are executable by a computer processor (e.g., one or more of processors 510a-510n) to cause the subject matter and the functional operations described herein. A memory (e.g., system memory 520) may include a single memory device and/or a plurality of memory devices (e.g., distributed memory devices).

I/O interface 550 may be configured to coordinate I/O traffic between processors 510a-510n, system memory 520, network interface 540, I/O devices 560, and/or other peripheral devices. I/O interface 550 may perform protocol, timing, or other data transformations to convert data signals from one component (e.g., system memory 520) into a format suitable for use by another component (e.g., processors 510a-510n). I/O interface 550 may include support for devices attached through various types of peripheral buses, such as a variant of the Peripheral Component Interconnect (PCI) bus standard or the Universal Serial Bus (USB) standard.

Embodiments of the techniques described herein may be implemented using a single instance of computing system 500 or multiple computing systems 500 configured to host different portions or instances of embodiments. Multiple computing systems 500 may provide for parallel or sequential processing/execution of one or more portions of the techniques described herein.

Those skilled in the art will appreciate that computing system 500 is merely illustrative and is not intended to limit the scope of the techniques described herein. Computing system 500 may include any combination of devices or software that may perform or otherwise provide for the performance of the techniques described herein. For example, computing system 500 may include or be a combination of a cloud-computing system, a data center, a server rack, a server, a virtual server, a desktop computer, a laptop computer, a tablet computer, a server device, a client device, a mobile telephone, a personal digital assistant (PDA), a mobile audio or video player, a game console, a vehicle-mounted computer, or a Global Positioning System (GPS), or the like. Computing system 500 may also be connected to other devices that are not illustrated, or may operate as a stand-alone system. In addition, the functionality provided by the illustrated components may in some embodiments be combined in fewer components or distributed in additional components. Similarly, in some embodiments, the functionality of some of the illustrated components may not be provided or other additional functionality may be available.

Those skilled in the art will also appreciate that while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computing system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computing system 500 may be transmitted to computing system 500 via transmission media or signals such as electrical, electromagnetic, or digital signals, conveyed via a communication medium such as a network or a wireless link. Various embodiments may further include receiving, sending, or storing instructions or data implemented in accordance with the foregoing description upon a computer-accessible medium. Accordingly, the present disclosure may be practiced with other computing system configurations.

Figure 6:
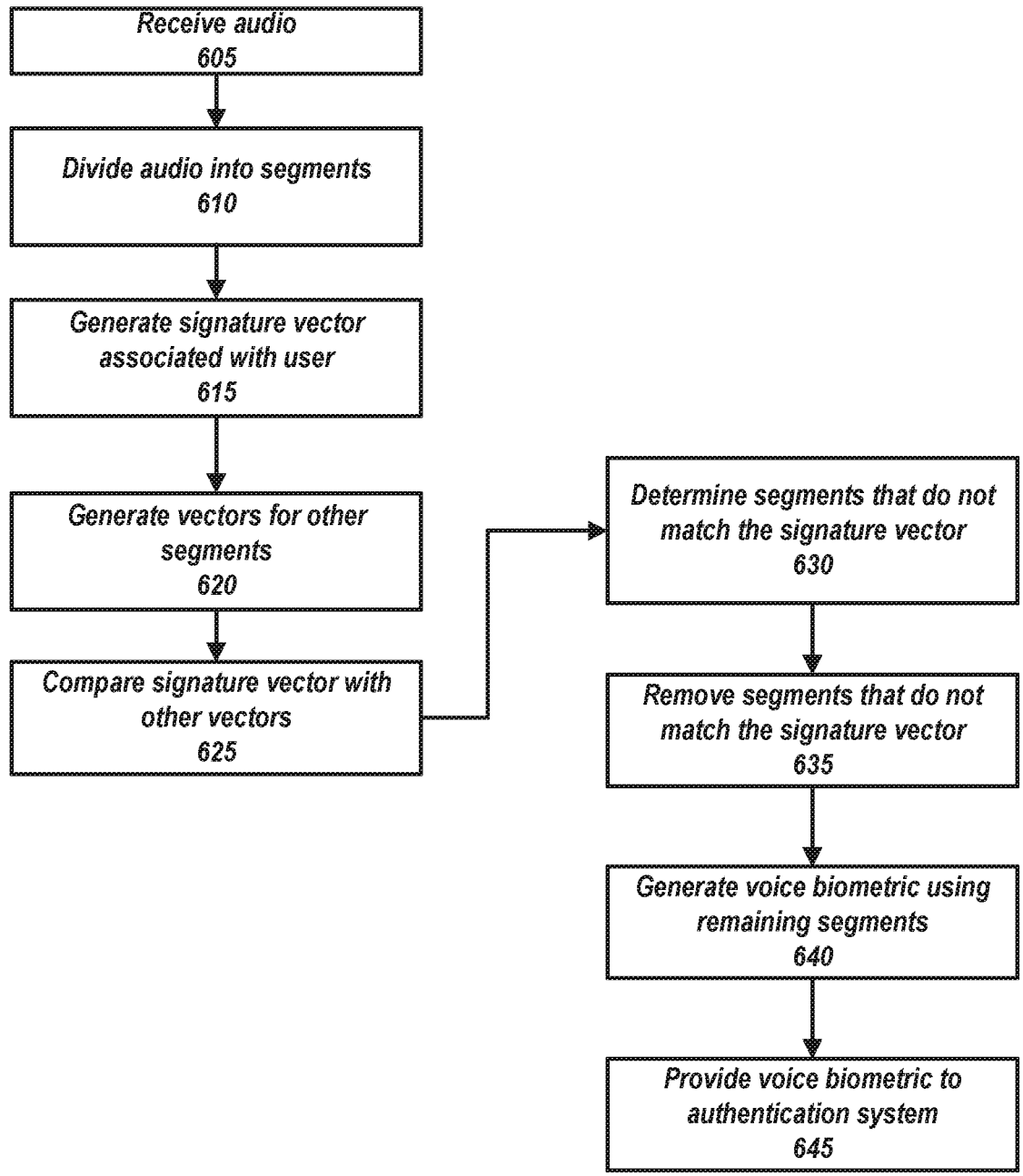
FIG. 6 shows an example flowchart of the actions involved in using machine learning for biometrics, in accordance with some embodiments.

FIG. 6 shows an example flowchart of the actions involved in using machine learning to determine what portions of audio may be used as a voice biometric. For example, process 600 may represent the actions taken by one or more devices shown in FIGS. 1-5 and described above. At 605, biometric system 102 (e.g., using one or more components in system 100 (FIG. 1) and/or computing system 500 via network interface 540 (FIG. 5)) receives audio. The audio may correspond to a call between a user and one or more call agents. The audio may include a first portion (e.g., audio from a call agent channel) and a second portion (e.g., audio from a user channel).

At 610, biometric system 102 (e.g., using one or more components in system 100 (FIG. 1) and/or computing system 500 via one or more processors 510a-510n and system memory 520 (FIG. 5)) divides the audio into segments. A first subset of the segments may include one or more segments (e.g., one or more consecutive segments) starting from the beginning of the audio file. A second subset of segments may include the remainder of the segments that are not included in the first subset of segments.

At 615, biometric system 102 (e.g., using one or more components in system 100 (FIG. 1) and/or computing system 500 via one or more processors 510a-510n, I/O interface 550, and/or system memory 520 (FIG. 5)) generates a signature vector associated with the user in the audio. The biometric system 102 may input the first subset of segments into a machine learning model (e.g., the machine learning model 402) to generate the signature vector.

At 620, biometric system 102 (e.g., using one or more components in system 100 (FIG. 1) and/or computing system 500 via one or more processors 510a-510n (FIG. 5)) generates vectors for other segments (e.g., segments in the second subset, segments not used for generating the signature vector, etc.) of the audio received in step 605.

At 625, biometric system 102 (e.g., using one or more components in system 100 (FIG. 1) and/or computing system 500 (FIG. 5)) compares the signature vector with the other generated vectors (e.g., the signature vector is compared with vectors generated for segments in the second subset). The comparing may comprise generating, by the biometric system 102, a distance or similarity score (e.g., using a distance metric such as cosine distance or any other distance metric) for each segment. The similarity score may indicate how similar a segment is to the signature vector.

At 630, biometric system 102 (e.g., using one or more components in system 100 (FIG. 1) and/or computing system 500 via the network interface 540 (FIG. 5)) determines segments that do not match the signature vector. The biometric system may determine that a segment matches the signature vector, for example, if the similarity score between the vector generated for the segment and the signature vector satisfies a threshold (e.g., the similarity score is above a threshold value).

At 635, biometric system 102 (e.g., using one or more components in system 100 (FIG. 1) and/or computing system 500 via one or more processors 510a-510n (FIG. 5)) removes segments that do not match the signature vector. For example, the biometric system 102 may generate a new audio file that contains only audio from the segments that are determined to match the signature vector.

At 640, biometric system 102 (e.g., using one or more components in system 100 (FIG. 1) and/or computing system 500 via one or more processors 510a-510n (FIG. 5)) generates a biometric using the segments that were not removed at 635.

At 645, biometric system 102 (e.g., using one or more components in system 100 (FIG. 1) and/or computing system 500 via one or more processors 510a-510n and/or network interface 540 (FIG. 5)) provides the voice biometric to an authentication server (e.g., the authentication server 106).

It is contemplated that the actions or descriptions of FIG. 6 may be used with any other embodiment of this disclosure. In addition, the actions and descriptions described in relation to FIG. 6 may be done in alternative orders or in parallel to further the purposes of this disclosure. For example, each of these actions may be performed in any order, in parallel, or simultaneously to reduce lag or increase the speed of the system or method. Furthermore, it should be noted that any of the devices or equipment discussed in relation to FIGS. 1-5 could be used to perform one or more of the actions in FIG. 6.

Figure 7:
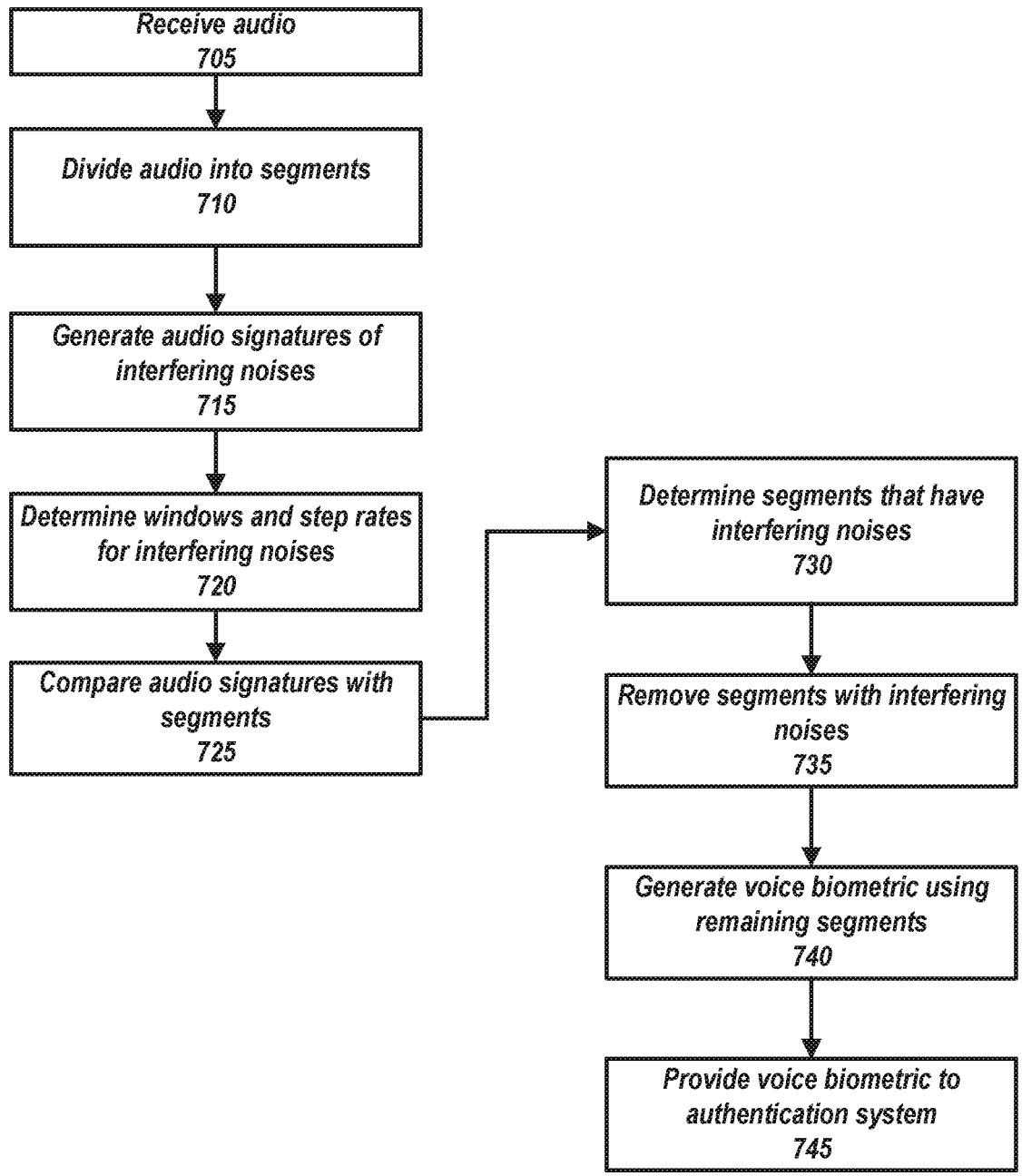
FIG. 7 shows an example flowchart of the actions involved in using machine learning for biometrics, in accordance with some embodiments.

FIG. 7 shows an example flowchart of the actions involved in using machine learning to determine what portions of audio may be used as a voice biometric. For example, process 700 may represent the actions taken by one or more devices shown in FIGS. 1-5 and described above. At 705, biometric system 102 (e.g., using one or more components in system 100 (FIG. 1) and/or computing system 500 via network interface 540 (FIG. 5)) receives audio. The audio may correspond to a call between a user and one or more call agents. The audio may include a first portion (e.g., audio from a call agent channel) and a second portion (e.g., audio from a user channel).

At 710, biometric system 102 (e.g., using one or more components in system 100 (FIG. 1) and/or computing system 500 via one or more processors 510a-510n and system memory 520 (FIG. 5)) divides the audio into segments. The segments may be equal length or different lengths.

At 715, biometric system 102 (e.g., using one or more components in system 100 (FIG. 1) and/or computing system 500 via one or more processors 510a-510n, I/O interface 550, and/or system memory 520 (FIG. 5)) generates one or more audio signatures (e.g., vectors) associated with one or more interfering noises.

At 720, biometric system 102 (e.g., using one or more components in system 100 (FIG. 1) and/or computing system 500 via one or more processors 510a-510n (FIG. 5)) determines windows and step rates for interfering noises. The biometric system 102 may determine a plurality of windows and a plurality of step rates corresponding to the plurality of audio signatures. Each window and/or each step rate may be determined based on a length of a corresponding interfering noise or audio signature. The length of each window may correspond to the length of the interfering noise (e.g., as measured in time). Each step rate may indicate an amount of time a corresponding window should move at each step in a loop over the audio file.

At 725, biometric system 102 (e.g., using one or more components in system 100 (FIG. 1) and/or computing system 500 (FIG. 5)) compares the audio signatures with each vector generated for the segments. The biometric system 102 may compare, based on the plurality of step rates and the plurality of windows, audio data within each of the plurality of segments with each of the plurality of audio signatures.

At 730, biometric system 102 (e.g., using one or more components in system 100 (FIG. 1) and/or computing system 500 via the network interface 540 (FIG. 5)) determines segments that comprise one or more interfering noises.

At 735, biometric system 102 (e.g., using one or more components in system 100 (FIG. 1) and/or computing system 500 via one or more processors 510a-510n (FIG. 5)) removes segments that comprise at least one interfering noise. For example, the biometric system 102 may generate a new audio file that contains only audio from the segments that are determined to contain no interfering noises or less than a threshold proportion of interfering noises.

At 740, biometric system 102 (e.g., using one or more components in system 100 (FIG. 1) and/or computing system 500 via one or more processors 510a-510n (FIG. 5)) generates a biometric using the segments that were not removed at 735.

At 745, biometric system 102 (e.g., using one or more components in system 100 (FIG. 1) and/or computing system 500 via one or more processors 510a-510n and/or network interface 540 (FIG. 5)) provides the voice biometric to an authentication server (e.g., the authentication server 106).

It is contemplated that the actions or descriptions of FIG. 7 may be used with any other embodiment of this disclosure. In addition, the actions and descriptions described in relation to FIG. 7 may be done in alternative orders or in parallel to further the purposes of this disclosure. For example, each of these actions may be performed in any order, in parallel, or simultaneously to reduce lag or increase the speed of the system or method. Furthermore, it should be noted that any of the devices or equipment discussed in relation to FIGS. 1-5 could be used to perform one or more of the actions in FIG. 7.

In block diagrams, illustrated components are depicted as discrete functional blocks, but embodiments are not limited to systems in which the functionality described herein is organized as illustrated. The functionality provided by each of the components may be provided by software or hardware modules that are differently organized than is presently depicted, for example such software or hardware may be intermingled, conjoined, replicated, broken up, distributed (e.g., within a data center or geographically), or otherwise differently organized. The functionality described herein may be provided by one or more processors of one or more computers executing code stored on a tangible, non-transitory, machine readable medium. In some cases, third party content delivery networks may host some or all of the information conveyed over networks, in which case, to the extent information (e.g., content) is said to be supplied or otherwise provided, the information may be provided by sending instructions to retrieve that information from a content delivery network.

The reader should appreciate that the present application describes several disclosures. Rather than separating those disclosures into multiple isolated patent applications, applicants have grouped these disclosures into a single document because their related subject matter lends itself to economies in the application process. But the distinct advantages and aspects of such disclosures should not be conflated. In some cases, embodiments address all of the deficiencies noted herein, but it should be understood that the disclosures are independently useful, and some embodiments address only a subset of such problems or offer other, unmentioned benefits that will be apparent to those of skill in the art reviewing the present disclosure. Due to costs constraints, some features disclosed herein may not be presently claimed and may be claimed in later filings, such as continuation applications or by amending the present claims. Similarly, due to space constraints, neither the Abstract nor the Summary sections of the present document should be taken as containing a comprehensive listing of all such disclosures or all aspects of such disclosures.

It should be understood that the description and the drawings are not intended to limit the disclosure to the particular form disclosed, but to the contrary, the intention is to cover all modifications, equivalents, and alternatives falling within the spirit and scope of the present disclosure as defined by the appended claims. Further modifications and alternative embodiments of various aspects of the disclosure will be apparent to those skilled in the art in view of this description. Accordingly, this description and the drawings are to be construed as illustrative only and are for the purpose of teaching those skilled in the art the general manner of carrying out the disclosure. It is to be understood that the forms of the disclosure shown and described herein are to be taken as examples of embodiments. Elements and materials may be substituted for those illustrated and described herein, parts and processes may be reversed or omitted, and certain features of the disclosure may be utilized independently, all as would be apparent to one skilled in the art after having the benefit of this description of the disclosure. Changes may be made in the elements described herein without departing from the spirit and scope of the disclosure as described in the following claims. Headings used herein are for organizational purposes only and are not meant to be used to limit the scope of the description.

As used throughout this application, the word "may" is used in a permissive sense (i.e., meaning having the potential to), rather than the mandatory sense (i.e., meaning must). The words "include". "including", and "includes" and the like mean including, but not limited to. As used throughout this application, the singular forms "a," "an," and "the" include plural referents unless the content explicitly indicates otherwise. Thus, for example, reference to "an element" or "a element" includes a combination of two or more elements, notwithstanding use of other terms and phrases for one or more elements, such as "one or more." The term "or" is, unless indicated otherwise, non-exclusive, i.e., encompassing both "and" and "or." Terms describing conditional relationships, e.g., "in response to X, Y," "upon X, Y,", "if X, Y," "when X, Y," and the like, encompass causal relationships in which the antecedent is a necessary causal condition, the antecedent is a sufficient causal condition, or the antecedent is a contributory causal condition of the consequent, e.g., "state X occurs upon condition Y obtaining" is generic to "X occurs solely upon Y" and "X occurs upon Y and Z." Such conditional relationships are not limited to consequences that instantly follow the antecedent obtaining, as some consequences may be delayed, and in conditional statements, antecedents are connected to their consequents, e.g., the antecedent is relevant to the likelihood of the consequent occurring. Statements in which a plurality of attributes or functions are mapped to a plurality of objects (e.g., one or more processors performing actions A, B, C, and D) encompasses both all such attributes or functions being mapped to all such objects and subsets of the attributes or functions being mapped to subsets of the attributes or functions (e.g., both all processors each performing actions A-D, and a case in which processor 1 performs action A, processor 2 performs action B and part of action C, and processor 3 performs part of action C and action D), unless otherwise indicated. Further, unless otherwise indicated, statements that one value or action is "based on" another condition or value encompass both instances in which the condition or value is the sole factor and instances in which the condition or value is one factor among a plurality of factors. The term "each" is not limited to "each and every" unless indicated otherwise. Unless specifically stated otherwise, as apparent from the discussion, it is appreciated that throughout this specification discussions utilizing terms such as "processing," "computing," "calculating," "determining" or the like refer to actions or processes of a specific apparatus, such as a special purpose computer or a similar special purpose electronic processing/computing device.

The above-described embodiments of the present disclosure are presented for purposes of illustration and not of limitation, and the present disclosure is limited only by the claims which follow. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

The present techniques will be better understood with reference to the following enumerated embodiments:

1. A method comprising receiving, by a computing device, an audio file; dividing the audio file into a plurality of segments comprising a first subset of segments and a second subset of segments; generating a signature vector indicative of voice audio of the user; generating a plurality of vectors; comparing the signature vector with each of the plurality of vectors; determining, based on the comparing, that the signature vector does not match one or more vectors of the plurality of vectors; in response to the determining that the signature vector does not match the one or more vectors of the plurality of vectors, removing audio corresponding to the one or more vectors that do not match the signature vector.

2. The method of any of the preceding embodiments, further comprising providing the remaining audio to a voice based user authentication system in response to determining that at least a threshold number of segments have not been removed from the audio.

3. The method of any of the preceding embodiments, wherein generating the signature vector comprises generating the signature vector by averaging a plurality of vectors.

4. The method of any of the preceding embodiments, wherein generating a signature vector indicative of the voice audio of the user comprises generating the signature vector by inputting a concatenated segment of audio into a machine learning model.

5. The method of any of the preceding embodiments, further comprising: dividing the second portion into equal length segments; generating a second plurality of vectors starting at a beginning of the second portion; determining a plurality of similarity scores by comparing a first vector of the second plurality of vectors with each other vector of the second plurality of vectors; and based on a determination that each similarity score of the plurality of similarity scores satisfies a threshold score, assigning each of the threshold number of segments to a first subset of segments.

6. The method of any of the preceding embodiments, wherein the comparing the signature vector with each of the plurality of vectors for the second subset of segments comprises: verifying, based on a comparison of the signature vector with stored audio associated with the user, that the signature vector corresponds to the user; and based on the verifying, comparing the signature vector with each of the plurality of vectors for the second subset of segments.
7. The method of any of the preceding embodiments, wherein the generating a voice biometric for the user comprises: generating a concatenated segment by concatenating each segment in a first portion of the audio; and generating, via a machine learning model, a vector corresponding to the concatenated segment.
8. The method of any of the preceding embodiments, wherein the generating a voice biometric for the user comprises: generating, based on one or more segments in a first portion of the audio, a second plurality of vectors; and generating the voice biometric for the user by averaging each vector of the second plurality of vectors.
9. A tangible, non-transitory, machine-readable medium storing instructions that, when executed by a data processing apparatus, cause the data processing apparatus to perform operations comprising those of any of embodiments 1-8.
10. A system comprising: one or more processors; and memory storing instructions that, when executed by the processors, cause the processors to effectuate operations comprising those of any of embodiments 1-8.
11. A system comprising means for performing any of embodiments 1-8.
12. A method comprising: receiving a first audio file comprising audio data; dividing the first audio file into a plurality of segments; receiving a plurality of audio signatures; comparing audio data within each of the plurality of segments with each of the plurality of audio signatures; determining, based on the comparing, that a threshold portion of a segment of the plurality of segments includes an interfering noise; in response to the determining that a threshold portion of the segment of the plurality of segments includes an interfering noise, generating a second audio file by removing the segment from the first audio file; generating, based on the second audio file, a voice biometric for the user; and providing the voice biometric to a voice-based user authentication system.
13. The method of any of the preceding embodiments, wherein determining that the threshold portion of the segment of the plurality of segments includes any interfering noise comprises: detecting a ringtone in a given segment of the first audio file, wherein the ringtone represents a switch from a first call agent to a second call agent; and based on detecting the ringtone in a given segment of the first audio file, marking all segments subsequent to the given segment for removal from the first audio file.
14. The method of any of the preceding embodiments, wherein the generating a voice biometric for the user further comprises: generating, based on each segment in the second audio file, a second plurality of vectors; and generating the voice biometric for the user by averaging each vector of the second plurality of vectors.
15. The method of any of the preceding embodiments, wherein the generating a voice biometric for the user further comprises: generating a concatenated segment by concatenating each segment in the second audio file; and generating the voice biometric by generating, via a machine learning model, a vector corresponding to the concatenated segment.
16. The method of any of the preceding embodiments, wherein the generating a voice biometric for the user comprises: determining a corresponding number of interfering noises for each segment in the second audio file; ranking segments of the second audio file based on the determined number of interfering noises; selecting, based on the ranking, a subset of segments of the second plurality of segments to use for the voice biometric; and generating the voice biometric using the subset of segments.
17. The method of any of the preceding embodiments, wherein the comparing audio data within each of the plurality of segments with each of the plurality of audio signatures comprises: selecting a first window of the plurality of windows, wherein the first window corresponds to a first audio signature and a first interfering noise; selecting a first portion of the audio file starting from a beginning of the audio file and ending at a first point in the audio file corresponding to a size of the first window; comparing the first portion of the audio file with a first audio signature associated with the first window; determining a second point in the audio file, wherein the second point in the audio file corresponds to a first step rate; determining a second portion of the audio based on the second point of the audio file and the first window size; and comparing the second portion of the audio file with the first audio signature.
18. The method of any of the preceding embodiments, further comprising setting the first step rate to a fraction or a percentage of the size of the first window.
19. The method of any of the preceding embodiments, wherein the providing the voice biometric to a voice-based user authentication system is performed in response to determining that at least a threshold number of segments have not been removed from the audio.
20. A tangible, non-transitory, machine-readable medium storing instructions that, when executed by a data processing apparatus, cause the data processing apparatus to perform operations comprising those of any of embodiments 12-19.
21. A system comprising: one or more processors; and memory storing instructions that, when executed by the processors, cause the processors to effectuate operations comprising those of any of embodiments 12-19.
22. A system comprising means for performing any of embodiments 12-19.

What is claimed is:
1. A system for identifying audio segments to be used as a biometric sample for user authentication, the system comprising:
one or more processors and computer program instructions that, when executed, cause the one or more processors to perform operations comprising:
receiving, by a computing device, a first audio file of a phone call between a user and one or more call agents;
dividing the first audio file into a plurality of segments;
generating, via a machine learning model, a plurality of audio signatures, wherein each audio signature of the plurality of audio signatures corresponds to an interfering noise;
determining a plurality of windows and a plurality of step rates corresponding to the plurality of audio signatures, wherein each window and each step rate is determined based on a length of a corresponding audio signature, wherein each window corresponds to an amount of time within the first audio file, and wherein each step rate indicates an amount of time a corresponding window should move at each step in a loop over the audio file;
comparing, based on the plurality of step rates and the plurality of windows, audio data within each of the plurality of segments with each of the plurality of audio signatures;
determining, based on the comparing, that a threshold portion of each of one or more segments of the plurality of segments includes at least one interfering noise;

in response to determining that a threshold portion of the one or more segments of the plurality of segments includes at least one interfering noise, generating a second audio file by removing the one or more segments from the first audio file;

determining a corresponding number of interfering noises for each segment in the second audio file;

ranking segments of the second audio file based on the determined number of interfering noises;

selecting, based on the ranking, a subset of segments;

generating, based on the subset of segments, a voice biometric for the user; and providing the voice biometric to a voice based user authentication system.

2. The system of claim 1, wherein providing the voice biometric to a voice based user authentication system is performed in response to determining that at least a threshold number of segments have not been removed from the audio.

3. The system of claim 1, wherein generating a voice biometric for the user further comprises:

generating, based on each segment in the second audio file, a second plurality of vectors; and generating the voice biometric for the user by averaging each vector of the second plurality of vectors.

4. A method comprising:

receiving, by a computing device, a first audio file comprising audio data associated with a user and one or more call agents;

dividing the first audio file into a plurality of segments;

receiving a plurality of audio signatures, wherein each audio signature of the plurality of audio signatures corresponds to an interfering noise;

comparing audio data within each of the plurality of segments with each of the plurality of audio signatures;

determining, based on the comparing, that a threshold portion of a segment of the plurality of segments includes an interfering noise;

in response to the determining that a threshold portion of the segment of the plurality of segments includes an interfering noise, generating a second audio file by removing the segment from the first audio file;

determining a corresponding number of interfering noises for each segment in the second audio file;

ranking segments of the second audio file based on the determined number of interfering noises;

selecting, based on the ranking, a subset of segments;

generating, based on the subset of segments, a voice biometric for the user; and providing the voice biometric to a voice-based user authentication system.

5. The method of claim 4, wherein determining that the threshold portion of the segment of the plurality of segments includes any interfering noise comprises:

detecting a ringtone in a given segment of the first audio file, wherein the ringtone represents a switch from a first call agent to a second call agent; and based on detecting the ringtone in a given segment of the first audio file, marking all segments subsequent to the given segment for removal from the first audio file.

6. The method of claim 4, wherein generating the voice biometric for the user further comprises:

generating, based on each segment in the second audio file, a second plurality of vectors; and generating the voice biometric for the user by averaging each vector of the second plurality of vectors.

7. The method of claim 4, wherein generating the voice biometric for the user further comprises:

generating a concatenated segment by concatenating each segment in the second audio file; and generating the voice biometric by generating, via a machine learning model, a vector corresponding to the concatenated segment.

8. The method of claim 4, wherein the comparing audio data within each of the plurality of segments with each of the plurality of audio signatures comprises:

selecting a first window of the plurality of windows, wherein the first window corresponds to a first audio signature and a first interfering noise;

selecting a first portion of the audio file starting from a beginning of the audio file and ending at a first point in the audio file corresponding to a size of the first window;

comparing the first portion of the audio file with a first audio signature associated with the first window;

determining a second point in the audio file, wherein the second point in the audio file corresponds to a first step rate;

determining a second portion of the audio based on the second point of the audio file and the first window size; and comparing the second portion of the audio file with the first audio signature.

9. The method of claim 8, further comprising setting the first step rate to a fraction or a percentage of the size of the first window.

10. The method of claim 4, wherein providing the voice biometric to the voice-based user authentication system is performed in response to determining that at least a threshold number of segments have not been removed from the audio.

11. A tangible, non-transitory, machine-readable medium storing instructions that when executed by one or more processors effectuate operations comprising:

receiving, by a computing device, a first audio file comprising audio data associated with a user and one or more call agents;

dividing the first audio file into a plurality of segments;

receiving a plurality of audio signatures, wherein each audio signature of the plurality of audio signatures corresponds to an interfering noise;

comparing audio data within each of the plurality of segments with each of the plurality of audio signatures;

determining, based on the comparing, that a threshold portion of a segment of the plurality of segments includes an interfering noise;

in response to the determining that a threshold portion of the segment of the plurality of segments includes an interfering noise, generating a second audio file by removing the segment from the first audio file;

determining a corresponding number of interfering noises for each segment in the second audio file;

ranking segments of the second audio file based on the determined number of interfering noises;

selecting, based on the ranking, a subset of segments;

generating, based on the subset of segments, a voice biometric for the user; and providing the voice biometric to a voice-based user authentication system.

12. The medium of claim 11, wherein determining that the threshold portion of the segment of the plurality of segments includes any interfering noise comprises:

detecting a ringtone in a given segment of the first audio file, wherein the ringtone represents a switch from a first call agent to a second call agent; and based on detecting the ringtone in a given segment of the first audio file, marking all segments subsequent to the given segment for removal from the first audio file.

13. The medium of claim 11, wherein generating the voice biometric for the user comprises:

generating, based on each segment in the second audio file, a second plurality of vectors; and generating the voice biometric for the user by averaging each vector of the second plurality of vectors.

14. The medium of claim 11, wherein generating the voice biometric for the user comprises:

generating a concatenated segment by concatenating each segment in the second audio file; and generating the voice biometric by generating, via a machine learning model, a vector corresponding to the concatenated segment.

15. The medium of claim 11, wherein comparing audio data within each of the plurality of segments with each of the plurality of audio signatures further comprises:

selecting a first window of the plurality of windows, wherein the first window corresponds to a first audio signature and a first interfering noise;

selecting a first portion of the audio file starting from a beginning of the audio file and ending at a first point in the audio file corresponding to a size of the first window;

comparing the first portion of the audio file with a first audio signature associated with the first window;

determining a second point in the audio file, wherein the second point in the audio file corresponds to a first step rate;

determining a second portion of the audio based on the second point of the audio file and the first window size; and comparing the second portion of the audio file with the first audio signature.

16. The medium of claim 15, wherein the instructions, when executed, effectuate operations further comprising setting the first step rate to a fraction or a percentage of the size of the first window.

17. The medium of claim 11, wherein providing the voice biometric to the voice-based user authentication system is performed in response to determining that at least a threshold number of segments have not been removed from the audio.

* * * * *